US007011575B2

(12) United States Patent
Smarsh

(10) Patent No.: US 7,011,575 B2
(45) Date of Patent: Mar. 14, 2006

(54) ROTATING HEAD MEAT TENDERIZER

(75) Inventor: Thomas J. Smarsh, Colwich, KS (US)

(73) Assignee: Cargill Meat Solutions Corporation, Wayzata, MN (US)

( * ) Notice: Subject to any disclaimer, the term of this patent is extended or adjusted under 35 U.S.C. 154(b) by 474 days.

(21) Appl. No.: 10/195,300

(22) Filed: Jul. 15, 2002

(65) Prior Publication Data

US 2004/0009275 A1 Jan. 15, 2004

(51) Int. Cl.
*A22C 17/00* (2006.01)

(52) U.S. Cl. .................................................... 452/141

(58) Field of Classification Search ........ 452/141–144, 452/198

See application file for complete search history.

(56) References Cited

U.S. PATENT DOCUMENTS

| | | | | |
|---|---|---|---|---|
| 2,503,687 | A | | 4/1950 | Richard |
| 2,561,867 | A | | 7/1951 | Jackson |
| 2,607,951 | A | | 8/1952 | Moree |
| 3,971,088 | A | | 7/1976 | Osiadacz |
| 4,283,813 | A | | 8/1981 | House |
| 4,343,067 | A | * | 8/1982 | Shelton ...................... 452/142 |
| 4,385,420 | A | * | 5/1983 | Shelton ...................... 452/142 |
| 5,525,102 | A | | 6/1996 | Jaccard |
| 5,607,349 | A | * | 3/1997 | Karubian et al. ........... 452/173 |
| 5,738,578 | A | | 4/1998 | Marchese |
| 5,976,005 | A | * | 11/1999 | Wilson et al. .............. 452/173 |
| 6,159,090 | A | | 12/2000 | Thompson |
| 6,190,250 | B1 | * | 2/2001 | Volk et al. .................. 452/177 |
| 6,605,308 | B1 | * | 8/2003 | Shane et al. ................ 426/332 |
| 2002/0072318 | A1 | | 6/2002 | Long |

FOREIGN PATENT DOCUMENTS

| | | | |
|---|---|---|---|
| EP | 0 286 607 | A1 | 10/1988 |

* cited by examiner

*Primary Examiner*—Thomas Price
(74) *Attorney, Agent, or Firm*—Dorsey & Whitney LLP

(57) ABSTRACT

A system for tenderizing meat that minimizes the probability of cross-contamination between successive pieces of meat product is disclosed. The apparatus includes at least one tenderizing head, a tenderizing station for supporting the meat product, and a treatment area where the tenderizing heads are cleaned and sanitized between operations on the meat product.

10 Claims, 4 Drawing Sheets

ROTATING HEAD MEAT TENDERIZER

FIELD OF THE INVENTION

The present invention relates to a system for tenderizing meat. More specifically, the present invention relates to a device and method for tenderizing meat that eliminates the potential for cross-contamination between successive pieces of meat product.

BACKGROUND OF THE INVENTION

Animals are slaughtered to provide meat for human consumption. The meat may be tender or tough depending on a variety of factors including the species, breed, age, and health of the animal slaughtered, the amount of exercise the animal received, whether the animal was fed at a feed lot prior to slaughter, and the type of feed the animal consumed. Humans tend to prefer tender meat because it is easier to eat and digest and tends to be more flavorful.

To improve the tenderness of meat meant for human consumption, various mechanized methods of meat tenderizing have been developed. These methods include pounding the meat with hammers, injecting tenderizing solutions into the meat, rolling the meat with a roller having protrusions, and penetrating the meat with knives, protrusions or needles.

These mechanized methods of meat tenderization share some commonalities. First, each method is typically a station along a processing line where pieces of meat move along a conveyor system as they are processed. Second, each method typically applies the same working surface to each piece of meat reaching the tenderizing station of the processing line. For example, a tenderizer will apply the same needle head (i.e., working surface) to each piece of meat moving along the process line. Finally, for each method, the working surface of the tenderizer penetrates the outside surface of the piece of meat.

Because a tenderizer applies the same working surface to each piece of meat, there is a danger of cross-contamination (spreading of bacteria or other contaminant) from one piece of meat to another. Also, because the working surface penetrates the outside surface of the piece of meat, contaminants from one piece of meat are driven inside of the following pieces of meat. Thus, for example, if a single piece of meat on the process line was contaminated with *E. coli,* the *E. coli* could potentially be spread to the interiors of the following pieces of meat. If a steak was one of those following pieces of meat and a consumer ate that steak in a rare condition (a way many consumers still eat their steaks), the *E. coli* inside the steak may not be killed and the consumer could become ill.

Consequently, there is a need in the art for a method of meat tenderization that will not present the current hazard of cross-contamination. There is also a need in the art for a device that will tenderize meat without presenting the current hazard of cross-contamination.

BRIEF SUMMARY OF THE INVENTION

The present invention, in one embodiment, is a tenderizing apparatus for tenderizing a meat product. The tenderizing apparatus includes at least one tenderizing head, a tenderizing station adapted to support the meat product during operation of the at least one tenderizing head, and a treatment area adapted to treat the at least one tenderizing head after the tenderizing head operates on the meat product.

Another embodiment of the present invention is a method of tenderizing meat while minimizing cross-contamination between a first meat product and a second meat product. The method includes providing the first meat product to a tenderizing station and operating on the first meat product with a first tenderizing head. Next, the first tenderizing head is transferred from the tenderizing station to a treatment area and the second tenderizing head is transferred from the treatment area to the tenderizing station. The second meat product is provided to the tenderizing station, and the second tenderizing head operates on the second meat product.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
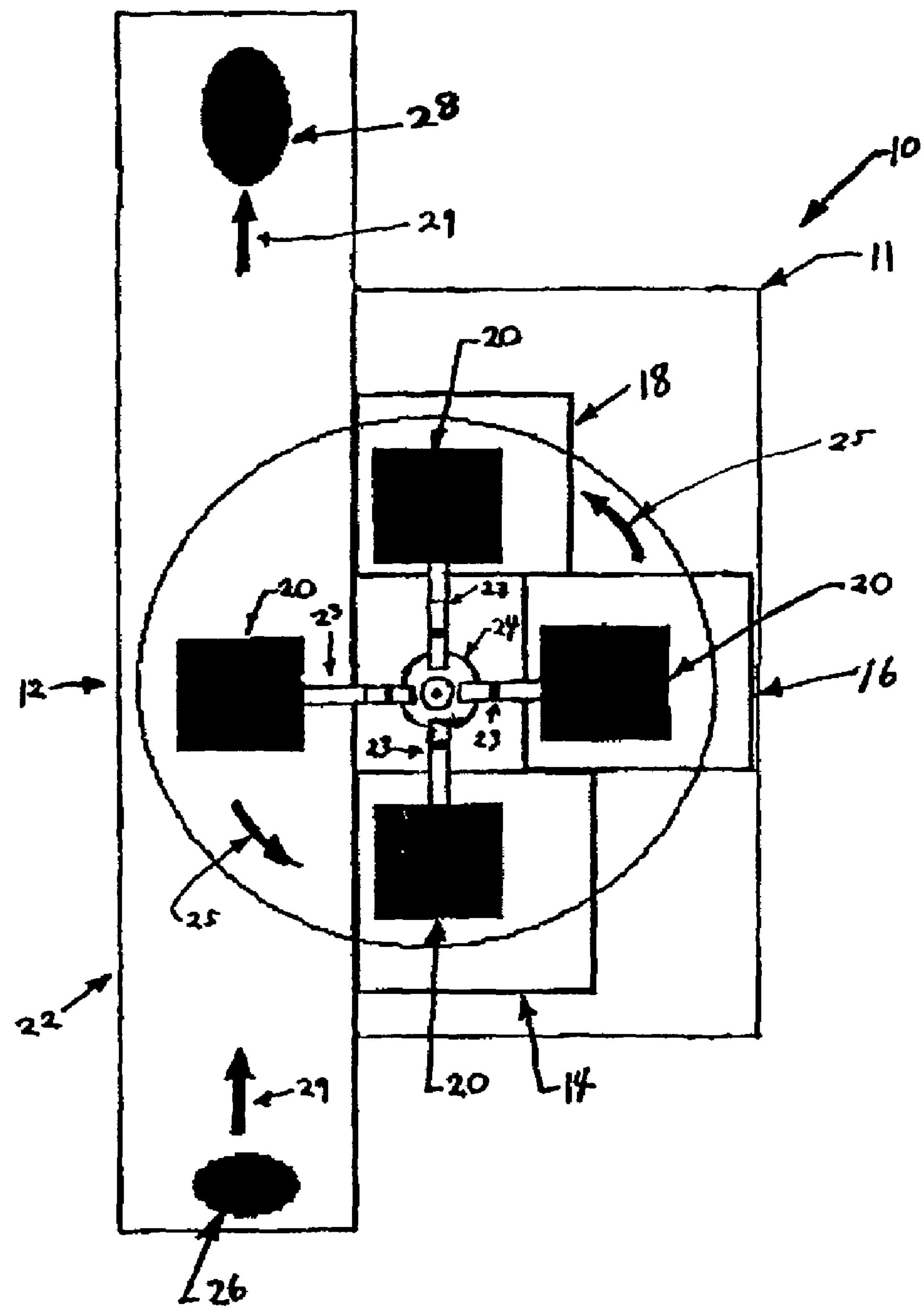
FIG. 1 is an overhead schematic view of one embodiment of the meat tenderizing system of the present invention.
Figure 2:
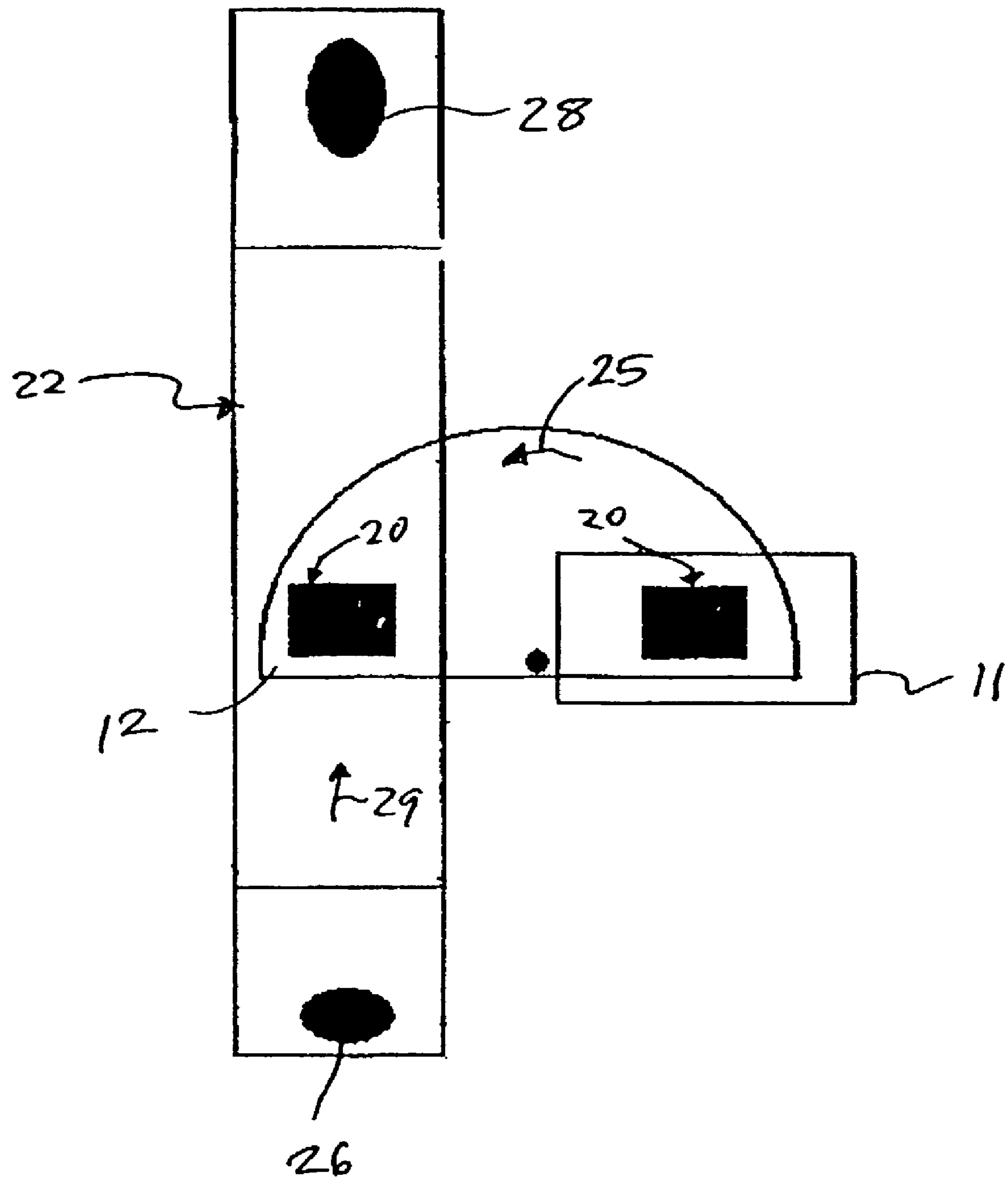
FIG. 2 is an overhead schematic view of another embodiment of the meat tenderizing system of the present invention, including two tenderizing heads.

FIG. 1 shows an overhead schematic view of one embodiment of the meat tenderizing system 10. As shown in FIG. 1, the meat tenderizing system 10 may include a treatment area 1, a tenderizing station 12, tenderizing heads 20, and a conveyor system 22. The treatment area 11 includes one or more treatment stations for cleaning or sanitizing the tenderizing heads 20. In one embodiment, for example, the treatment area 11 includes one or more of the following treatment stations: a washing/steam cleaning station 14, a sanitizing station 16, and an air-dry station 18. In one embodiment, as shown in FIG. 2, the treatment area 11 includes only one treatment station, which performs all necessary cleaning and sanitizing of the tenderizing heads 20. The embodiment shown in FIG. 2 includes two tenderizing heads 20, although only one tenderizing head 20 is necessary.

The conveyor system 22 operates to transport non-tenderized meat product 26 to the tenderizing station 12 where one of the tenderizing heads 20 will convert the non-tenderized meat product 26 into tenderized meat product 28. The conveyor system 22 will then convey the tenderized meat product 28 away from the tenderizing station 12 to other processes on the process line. In FIGS. 1–4, the direction of travel of the meat product 26, 28 on the conveyor system 22 is reflected by the direction arrows 29. Alternatively, the conveyor system 22 could be eliminated and each piece of non-tenderized meat product 26 could be individually placed at the tenderizing station 12.

Each tenderizing head 20 will have a means for tenderizing meat such as one or more rollers with or without protrusions, a flat plate with or without protrusions, a frame containing an array of knives, needles, or hammers, or any other means for tenderizing meat as is known in the art of meat tenderizing. In one embodiment, the tenderizing head 20 is an array of needles. While the embodiment illustrated in FIG. 1 shows four tenderizing heads 20, those skilled in the art will recognize that other embodiments of the meat tenderizing system 10 may have greater than or less than four tenderizing heads 20 (see, for example, FIGS. 2–4).

Referring again to FIG. 1, the washing/steam cleaning station 14 is partially or totally enclosed area wherein a tenderizing head 20 is washed or steam cleaned (or both) to remove debris and pathogens clinging to the tenderizing head 20. The sanitizing station 16 is a partially or totally enclosed area wherein a tenderizing head 20 is exposed to a sanitizer, such as chemical sprays/baths or irradiation by an energy source to neutralize pathogens present on the tenderizing head 20. The air-dry station 18 is a partially or totally enclosed area wherein a tenderizing head 20 is air and/or heat dried. Isolation between the treatment stations 14, 16, 18, if desired, may be maintained simply by adequate spacing or by dividing means such as solid walls, partitions, panels or doors, flexible polymer strip curtains, or air-walls.

Figure 3:
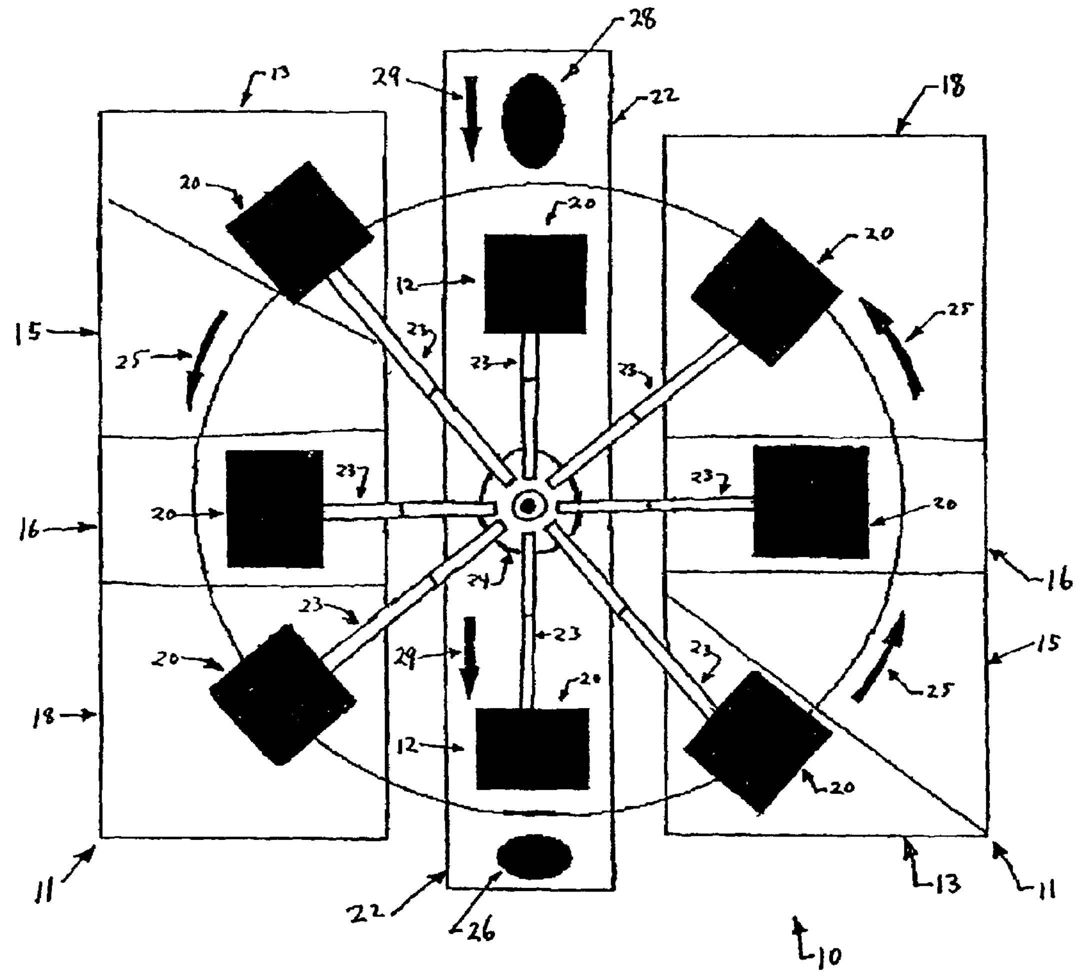
FIG. 3 is an overhead schematic view of another embodiment of the meat tenderizing system of the present invention, including treatment stations on both sides of a tenderizing station.
Figure 4:
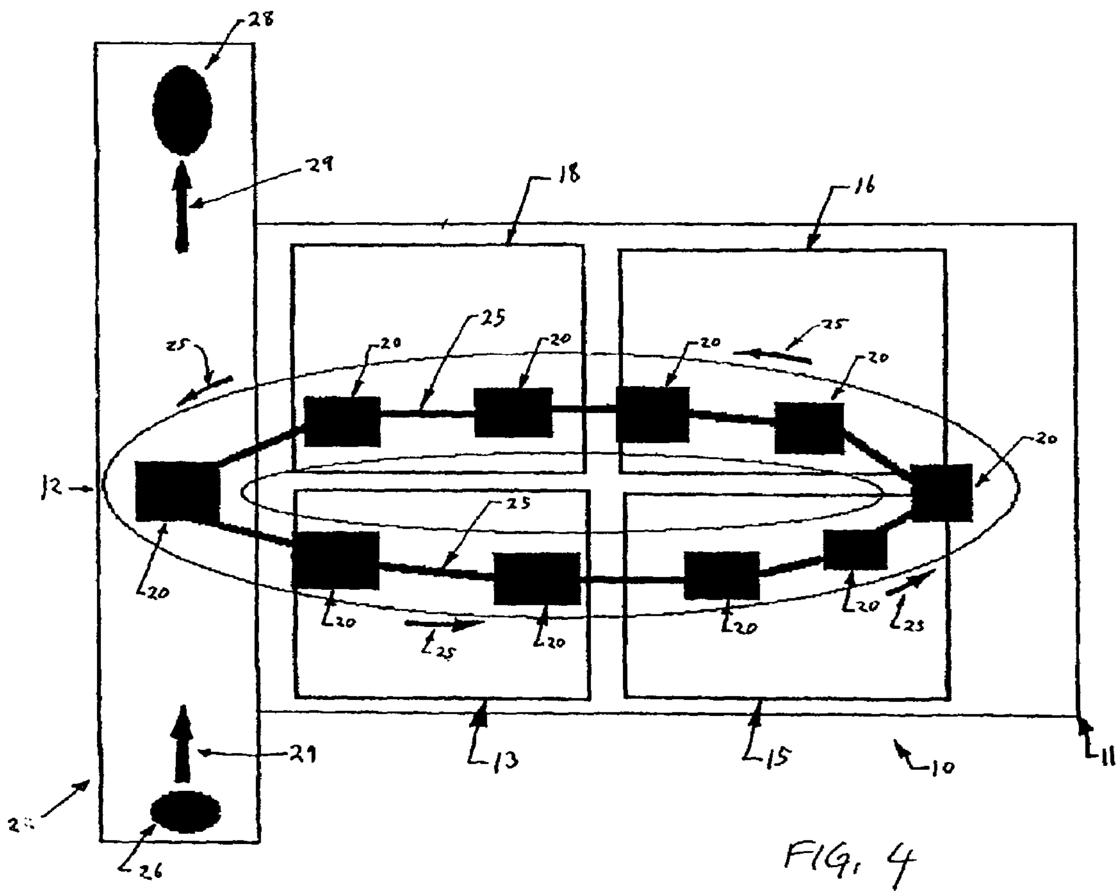
FIG. 4 is an overhead schematic view of another embodiment of the meat tenderizing system of the present invention, including multiple tenderizing heads and multiple treatment stations.

In other embodiments of the meat tenderizing system 10, the treatments to be applied to the tenderizing heads 20 in each treatment station 14, 16, 18 (as reflected in FIG. 1) may be divided up into more treatment stations resulting in a greater number of treatment stations being contained in each treatment area 11. For example, as shown in FIGS. 3 and 4, the washing/steam cleaning station 14 could be split into two treatment stations, one being a washing station 13 and the other being a steam cleaning station 15. Conversely, the treatments to be applied to the tenderizing heads 20 in each treatment station 14, 16, 18 could be combined resulting in fewer treatment stations being contained in each treatment area 11. For example, the washing/steam cleaning station 14 could be combined with the sanitizing station 16 to form a washing/steam cleaning/sanitizing station. Additionally, the treatment stations 13, 14, 15, 16, 18 could be located in different configurations around the tenderizing station 12 (see FIG. 3 and FIG. 4). Also, multiple numbers of each treatment station 13, 14, 15, 16, 18 type could be used to provide multiple complete treatment areas 11, as reflected in FIG. 3.

During operation, each tenderizing head 20 will travel from one station 12, 14, 16, 18 of the meat tenderizing system 10 to the next. Travel of each tenderizing head 20 between the various stations 12, 14, 16, 18 of the meat tenderizing system 10 is accomplished using any technique known in the art. In one embodiment, as reflected in FIG. 1 and FIG. 3, each tenderizing head 20 is mounted to mechanical arms 23, which radiate from a pivot center 24. The tenderizing head 20 is mounted on the free end of each arm 23, the opposite end of each arm 23 being connected to the pivot center 24. The arms 23 are adapted to rotate about the pivot center 24, thereby transporting its respective tenderizing head 20 through the various stations 12, 14, 16, 18 of the meat tenderizing system 10. Each head 20 is present in the tenderizing station 12 long enough to tenderize a piece of non-tenderized meat product 26. Each head 20 is present in each treatment station 14, 16, 18 of the treatment area 11 long enough to allow the respective station's treatment to be accomplished.

Those skilled in the art will recognize other means of transporting the tenderizing heads 20 from one station 12, 14, 16, 18 of the meat tenderizing system 10 to the next, including a system of tracks or rails 25, as reflected in FIG. 4. Also, as shown in FIG. 2, in one embodiment, the tenderizing heads 20 are mounted to a rotating plate or disc. Referring to FIGS. 1–4, the direction of travel of the tenderizing heads 20 is reflected by the direction arrows 25, although either direction of travel of the tenderizing heads 20 could be used with the present invention.

The operation of the meat tenderizing system 10 will now be discussed, with reference to FIG. 1. The conveyor system 22 will transport non-tenderized meat product 26 along a process line to the tenderizing station 12. Upon arrival at the tenderizing station 12, a mechanical arm 23 will apply its tenderizing head 20 to the non-tenderized meat product 26, converting it to tenderized meat product 28. The arm 23 will retract the tenderizing head 20 from the newly created tenderized meat product 28 and the conveyor system 22 will then transport the newly created tenderized meat product 28 from the tenderizing station 12 to additional processes further down the process line.

The arm 23 will then rotate about the pivot center 24, thereby transferring its tenderizing head 20 to the washing/steam cleaning station 14. At the same time, all other arms 23 will rotate about the pivot center 24, thereby transferring their respective tenderizing heads 20 to the next station 12, 14, 16, 18 of the meat tenderizing system 10. Thus, the arm 23 previously located in the air-dry station 16 will transport its tenderizing head 20 into position at the tenderizing station 12 for operation on a new non-tenderized meat product 26 on the conveyor system 22. The process will then repeat, as necessary. In the embodiment shown in FIG. 3, two tenderizing heads 20 operate on two cuts of non-tenderizing meat product simultaneously, thus increasing overall line processing speed.

In one embodiment, the meat tenderizing system 10 further includes a control system for controlling the rotation of the pivot center 24 and the actuation of the arms 23 holding the tenderizing heads 20. The control system also controls the amount of time the tenderizing heads spend at each station 12, 14, 16, 18 of the meat tenderizing system 10 and the translation of the conveyor system 22. In one embodiment, the control system further controls the operation of each treatment station 14, 16, 18 in the treatment area 11, by controlling the introduction of water, steam, sanitizing agent, or air into each station.

Pursuant to the process of the present invention, each non-tenderized meat product 26 will encounter a freshly cleaned and sanitized tenderizing head 20. In other words, once a tenderizing head 20 has been applied to a non-tenderized meat product 26, that same tenderizing head 20 will not be applied to another non-tenderized meat product 26 without first undergoing the treatments in the treatment area 11. As a result, the danger of cross-contamination (spreading of bacteria or other contaminant) from one piece of meat to another, as currently exists in the art of meat tenderization because of the application of the same tenderizing head to successive pieces of meat, will be eliminated. It should be noted that the meat tenderizing system 10 is equally applicable for the tenderization of all types of animal flesh, including but not limited to, beef, pork, lamb, poultry, and fish.

Although the subject invention has been described with reference to illustrative embodiments, and more specifically in the context of the tenderizing of meat products, those skilled in the art will recognize that the subject invention is equally applicable to the performance of other types of meat processing such as cutting, chopping, and the injection of brines, flavorings, and preservatives. Those skilled in the art will also recognize that the subject invention is equally applicable to the processing of other food products (e.g., vegetables, fruits, breads, and cheeses) where a food processing machine's working surface (e.g., choppers, cutters, formers, and injectors) comes into contact with successive pieces of food and cross-contamination could be the result. Consequently, the invention should not be limited only to the tenderizing of meat products, but should be found applicable to the performance of other types of meat processing and to the processing of other food types. Furthermore, persons skilled in the art will recognize that changes may be made in form and detail without departing from the spirit and scope of the invention.

I claim:

1. A tenderizing apparatus for tenderizing a meat product, the tenderizing apparatus comprising:

a tenderizing head;

a tenderizing station adapted to support the meat product during operation of the tenderizing head;

a treatment area adapted to treat the tenderizing head after the tenderizing head operates on the meat product; and a mechanical arm, the arm adapted to transfer the tenderizing head from the tenderizing station through the treatment area.

2. The apparatus of claim 1 wherein the treatment area comprises a treatment station.

3. The apparatus of claim 2 wherein the treatment station is a washing station.

4. The apparatus of claim 2 wherein the treatment station is a steam cleaning station.

5. The apparatus of claim 2 wherein the treatment station is a sanitizing station.

6. The apparatus of claim 2 wherein the treatment station is an air-dry station.

7. The apparatus of claim 2 wherein the treatment station is a washing/steam cleaning station.

8. The apparatus of claim 2 wherein the tenderizing head is selected from the group consisting of: at least one roller without protrusions; at least one roller with protrusions; a flat plate without protrusions; a flat plate with protrusions; a frame containing at least one knife; a frame containing at least one needle; and a frame containing at least one hammer.

9. The apparatus of claim 1 wherein the tenderizing head comprises means for tenderizing meat.

10. The apparatus of claim 1 further comprising a conveyor system.

* * * * *